United States Patent [19]

Petryk, Jr.

[11] 4,350,973
[45] Sep. 21, 1982

[54] RECEIVER APPARATUS FOR CONVERTING OPTICALLY ENCODED BINARY DATA TO ELECTRICAL SIGNALS

[75] Inventor: Edward M. Petryk, Jr., Phoenix, Ariz.

[73] Assignee: Honeywell Information Systems Inc., Phoenix, Ariz.

[21] Appl. No.: 59,879

[22] Filed: Jul. 23, 1979

[51] Int. Cl.³ .......................................... H03K 13/00
[52] U.S. Cl. ................................ 340/347 DD; 360/42
[58] Field of Search ................... 350/96.1; 360/42, 43; 340/347 DD

[56] References Cited

U.S. PATENT DOCUMENTS

| | | | |
|---|---|---|---|
| 3,727,202 | 4/1973 | Fort | 360/42 |
| 3,795,903 | 3/1974 | Lindsey | 360/42 |
| 3,925,727 | 12/1975 | Duguay | 250/227 X |
| 3,979,746 | 9/1976 | Jarrett | 360/42 X |
| 4,137,451 | 1/1979 | Einolf, Jr. | 340/347 P X |

OTHER PUBLICATIONS

The Engineering Staff of Analog Devices, Inc., Analog-Digital Conversion Handbook, 6/1972, pp. I-2,3; I-8,9; II-44,45; II-80,81.

Primary Examiner—Thomas J. Sloyan
Attorney, Agent, or Firm—W. W. Holloway, Jr.; N. Prasinos; L. J. Marhoefer

[57] ABSTRACT

An apparatus for receiving optically encoded binary data transmitted over an optical fiber from an optical transmitter device coupled to another data processing system. The receiver apparatus is used to convert the light signal carrying the subject data into TTL level digital logic signals. The receiver apparatus is comprised of circuitry for converting the optically encoded data into electrical signals in serial format, and circuitry for converting these electrical signals into TTL level digital signals in parallel format for use by a user device. The primary advantage of the apparatus disclosed here is the ability to substitute a single optical fiber for a plurality of parallel copper wires for carrying data between one data processing device and another with little or no loss in speed due to the larger bandwidth of optical fibers. Another significant advantage is the ability to couple data processing systems directly over much larger distances than possible with average cost parallel copper wire electrical cables. Higher noise immunity and communications security is also enjoyed. In the preferred embodiment, the receiver apparatus comprises a photodiode for converting the light signal into an electrical signal followed by an amplifier for changing the electrical signal to TTL digital logic levels. A clock generator and header detector recover a clock signal and detect the receipt of a header signal indicating transmission of a serial format data packet has commenced. A serial in and parallel out shift register/data latch storage buffer combination utilizes a signal derived from the recovered clock signal to shift the incoming data bits into the shift register and latch them into the data latch output buffers in parallel format when a counter signals that an entire data packet has been received.

2 Claims, 22 Drawing Figures

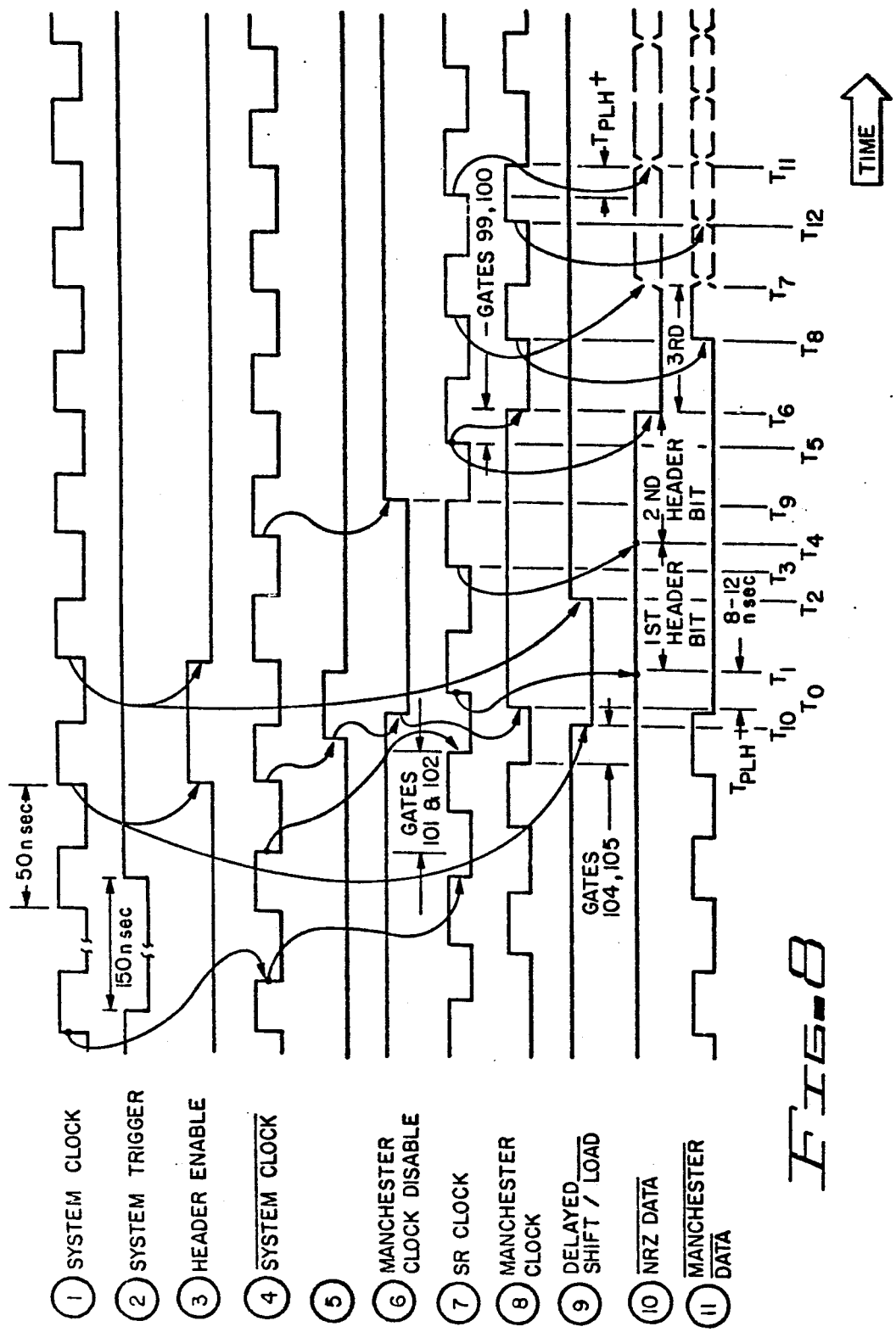

RECEIVER APPARATUS FOR CONVERTING OPTICALLY ENCODED BINARY DATA TO ELECTRICAL SIGNALS

BACKGROUND OF THE INVENTION

The invention relates generally to the field of data links between central processing units and peripherals, and specifically, to serial transfer of parallel data by time division multiplexing through light conducting fibers. In the past, links for transfer between a CPU and peripherals have been either in serial or parallel format. However, most of these links have utilized copper conductor cables. Parallel links were favored because of increased speed even though such links were more expensive to design and build.

The speeds and lengths at which these parallel copper links could function were limited by the physical characteristics of the cable and the physics of electrical data transmission. For example, the geometry and composition of the cables resulted in losses due to impedance of the cables. In addition, the inherent stray capacitance in these cables slowed rise times thereby hindering speed. Minimizing these characteristics by altering the physical structure of the electrical cable is expensive.

On the other hand, the physics and material properties of optical fibers result in lower losses during transmission. Further, these losses are uniform up to a few hundred megahertz resulting in a large bandwidth. This broad bandwidth enables extremely high data transfer rates with little loss in performance. For example, an optical cable TV installation designed by the Harris Corporation in London, Ontario will be operating at 322 megabits per second in mid-1979 at repeater spacings of 2.6 kilometers. Harris has also designed a 51 kilometer 274 megabit optical phone link scheduled for completion in late 1979. The useful lives of these optical links are expected to be from twenty to thirty years as opposed to five to seven years for an electrical link.

Further, the performance of fiber optic devices is being continually improved, and, as seen in the integrated circuits industry in the 1970's, prices for optical components will continue to fall as mass production techniques are devised and perfected.

In the computer industry, there are many applications suited for fiber optics. The large number of wires that connect CPU's to peripherals can be drastically reduced in size and number. In addition, longer links are feasible making possible distributed processing systems with CPU's spaced several kilometers apart as opposed to several feet apart. Thus the distance a peripheral may be spaced from its CPU no longer needs to be a limiting parameter of a computer system. Also noisy mechanical peripherals such as card readers, punches and printers may be placed in a different room from that of the CPU. Extra electrical noise immunity also results from use of optical fibers since radio frequency interference and cross talk via inductive coupling cannot occur.

Other remaining advantages of optical links include: ground loop elimination, size and weight reduction, no spark or fire hazard, higher transmission security, no short circuit loading, no ringing or echoes, and the ability to operate at temperatures up to 1000° C.

SUMMARY OF THE INVENTION

There is disclosed herein an apparatus for receiving digital data from another data processing or communication system where said data is transmitted to the device disclosed herein via a light signal transmitted over an optical fiber. In the preferred embodiment, the data from the other data processing system is encoded in Manchester code. The receiving apparatus disclosed herein utilizes a photodiode to convert the light signal to an electrical signal. This electrical signal is amplified and converted to TTL digital signal levels by an amplifier chip. The output from this amplifier is passed through a clock generator circuit which recovers a clock signal from the Manchester encoded data and outputs a recovered clock signal. The clock generator also outputs an SR Data signal and a Manchester Data Delayed signal. These two signals are the same signal as present at the output of the amplifier but delayed in time. A header detector circuit monitors the Manchester Data Delayed signal for a header signal encoded therein indicating the start of transmission of a data packet over the optical fiber. The header detector also gates the Recovered Clock signal through to its Data Clock output upon receipt of the header signal. The header detector also begins to count the number of periods in the Recovered Clock signal upon receipt of the header signal, and generates a Data Latch signal after a predetermined number of periods of the Recovered Clock signal. Each clock period corresponds to one bit time in the incoming data signal. The number of data bits in a data packet depends upon the needs of an external user device connected to the output of the receiver apparatus disclosed herein. A shift register and data latch circuit is coupled to the SR Data signal, the Data Latch signal and the Data Clock signal. Upon receipt of the header signal, the appearance of the Data Clock signal causes the shift register to shift the data bits of the SR Data signal into the shift register at the rate of one data bit per clock period of the data clock signal. Upon receipt of the Data Latch signal from the header detector, the shift register strobes the data shifted in data into a plurality of data latch storage buffers having parallel access output lines. The data in these data latch storage buffers remains resident on the parallel access data output lines for use by an external user device until a new data packet has been shifted into the shift register and a new Data Latch signal has been received.

The receiver apparatus disclosed herein is a subcombination of a larger overall combination disclosed in the specification herein. The overall combination is disclosed so that those skilled in the art may better understand the reasoning and theory of operation behind the receiver apparatus disclosed herein.

A better understanding of the principles and advantages of the invention may be had after consideration of the detailed description of the invention with reference to the drawings.

BRIEF DESCRIPTION OF THE DRAWINGS

FIG. 8 is a timing diagram showing the relationship of the various waveforms in the transmitter interface logic;

DESCRIPTION OF THE PREFERRED EMBODIMENT

Figure 1:
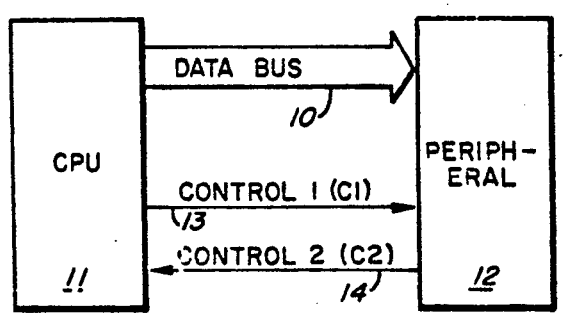
FIG. 1 is a simplified diagram of a typical unidirectional parallel transfer interface between a CPU and a peripheral.
Figure 2:
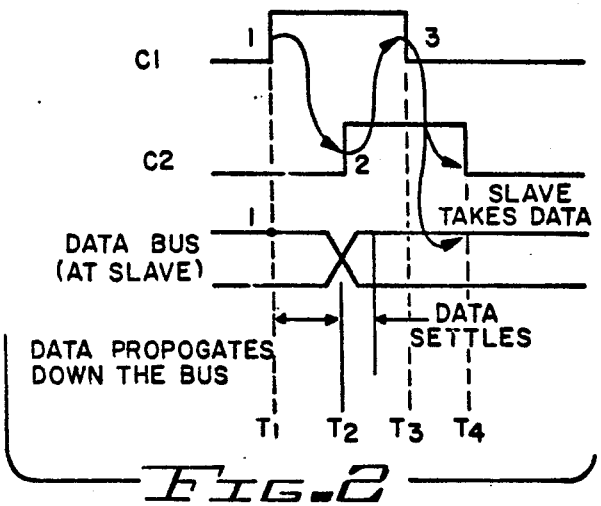
FIG. 2 is handshaking timing diagram for the protocol scheme of FIG. 1.

Referring now to FIG. 1, there is shown a simplified schematic diagram of a typical parallel transfer along DATA BUS 10 between CPU 11 and PERIPHERAL DEVICE 12. The optical link can also be used for transfers between any other units in a data processing or other digital system. Control lines 13 and 14 carry handshaking signals which interlock to acknowledge reliable transfer of data. Typically PERIPHERAL 12 will be a card reader, card punch or printer, but also be a microprocessor or other unit. FIG. 2 shows the typical timing of the hand-shaking signals on control lines 13 and 14 during a data transfer.

A transfer of data from the CPU 11 to the PERIPHERAL 12 along DATA BUS 10 occurs in the following fashion. At time $T_1$, CPU 11 places the data on DATA BUS 10 and raises control line 13 (signal C1 in FIG. 2). The C1 signal propagates down line 13 and the data propagates down DATA BUS 10 and both arrive at PERIPHERAL 12 at time $T_2$. In response to the raising of C1, PERIPHERAL 12 raises CONTROL LINE 14 (C2 signal in FIG. 2) to acknowledge that it is prepared to accept the data. C2 propagates back to CPU 11 along CONTROL LINE 14 causing CPU to drop the C1 signal to at time $T_3$ to acknowledge receipt of C2. The downward transition of C1 propagates back to PERIPHERAL 12 and tells it to take the data off DATA BUS 10. Meanwhile the data has had two propagation delays to become stabilized at PERIPHERAL 12. PERIPHERAL 12 takes the data off the DATA BUS at time $T_4$ and lowers C2 on line 14 indicating that the transfer has been completed.

The completed transaction is called a "dialogue". Such dialogues could be simpler than described here. In actual computer systems, transfers using interlocking hand-shaking signals may be more complicated since more control lines are usually involved. Nevertheless, the sequence of events remains generally the same. The optical link described herein is designed to retain this hand-shaking protocol technique but to change the format of the transfer from parallel bits to a serial packet of data comprised of a several bit header followed by a packet of an arbitrarily selected number of data and control bits.

Figure 3:
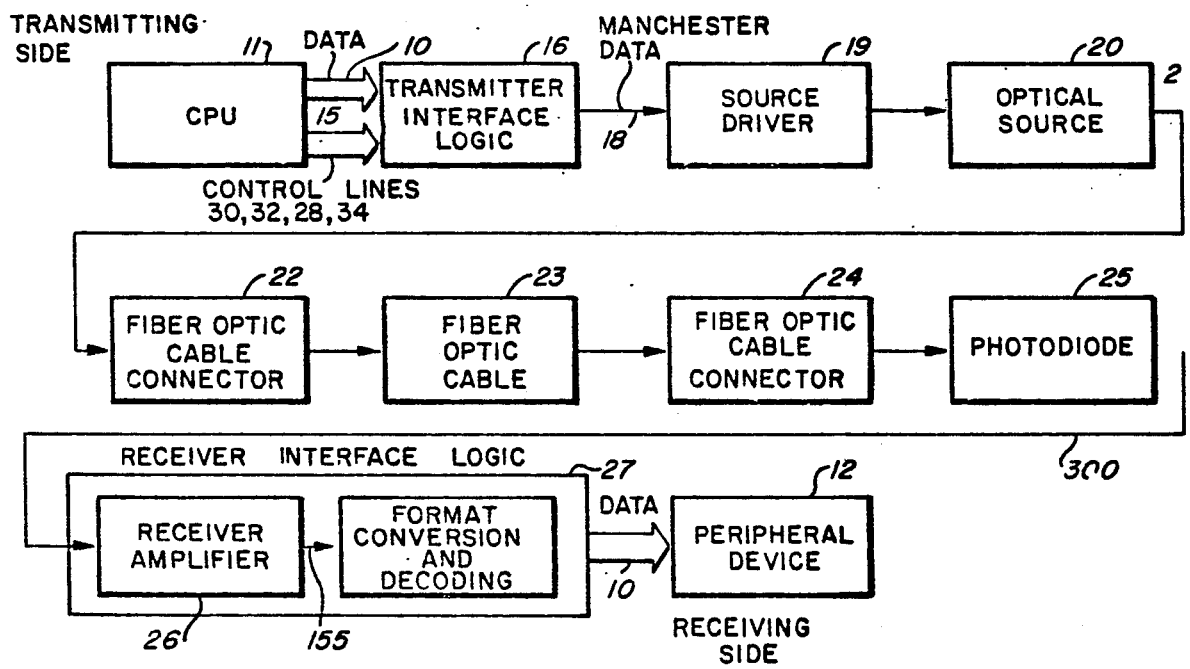
FIG. 3 is a block diagram of a unidirectional optical link for serial format data transfers between the CPU and a peripheral.

Referring now to FIG. 3, there is shown a block diagram of the elements comprising a unidirectional optical link from CPU 11 to PERIPHERAL 12. CENTRAL PROCESSING UNIT 11 sends parallel data via DATA BUS 10 to TRANSMITTER INTERFACE LOGIC 16. CONTROL BUS 15 carries control signals from the CPU to TRANSMITTER INTERFACE LOGIC 16. This unit will be elaborated upon later, but suffice it to say now that its purpose is to convert from parallel to serial format and encode the data for optical transmission. The MANCHESTER DATA signal on line 18 drives SOURCE DRIVER 19 which in turn electrically excites OPTICAL SOURCE 20. SOURCE DRIVER 19 can be a Texas Instruments 75453B positive-OR driver comprising an OR gate driving an output transistor. SOURCE DRIVER 19 and OPTICAL SOURCE 20 could be combined in some new technology. The output transistor of SOURCE DRIVER 19 drives an RCA 30133 light emitting diode which is OPTICAL SOURCE 20. OPTICAL SOURCE 20 serves to convert the electrical signal from SOURCE DRIVER 19 into a light signal. OPTICAL SOURCE 20 has a length of fiber optic cable called a PIGTAIL 21 to serve as its output window. This PIGTAIL is optically coupled to the emitting region of the LED and extends about 127 millimeters (5 inches) from the surface of the device package.

Figure 4:
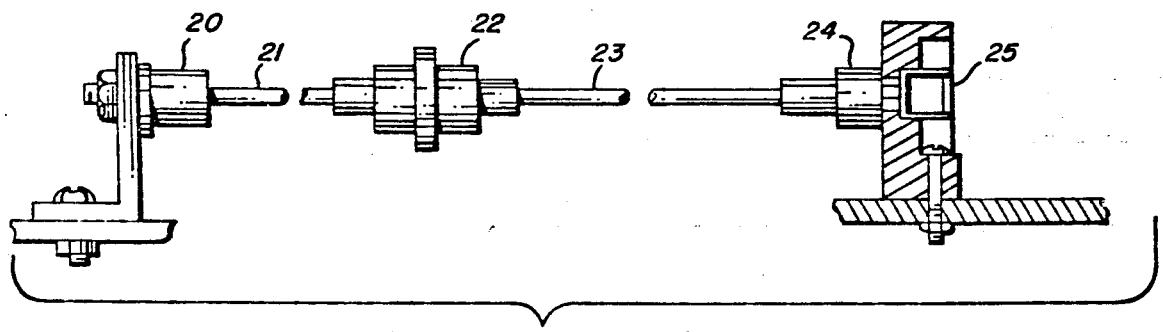
FIG. 4 is a drawing of the mechanical connections comprising the unidirectional optical link.

A more-detailed drawing of the mechanical structure of the unidirectional optical link is shown in FIG. 4. The arrangement depicted is only typical and others could be used. PIGTAIL 21 connects OPTICAL SOURCE 20 to FIBER OPTIC CABLE CONNECTOR 22 which can be an AMP INC. connector. The purpose of FIBER OPTIC CABLE CONNECTOR 22 is to clamp FIBER OPTIC CABLE 23 into intimate optical engagement with PIGTAIL 21.

FIBER OPTIC CABLE 23 serves as the light path in the preferred embodiment and can be a Canstar optic cable type number D2P-125/250 manufactured by Canstar Optical Fiber Products Division. It serves to receive the light signal from the OPTICAL SOURCE 20 and conduct it down the cable's length to a distal end removed some distance from the position of the optical source. FIBER OPTIC CABLE 23 terminates in a second FIBER OPTIC CABLE CONNECTOR 24 which serves to connect FIBER OPTIC CABLE 23 to PHOTODIODE 25.

PHOTODIODE 25 can be a RCA 30808 single element silicone PIN diode which serves to convert the light signal coming in from the FIBER OPTIC CABLE 23 into electrical signals usable by a RECEIVER AMPLIFIER 26. RECEIVER AMPLIFIER 26 can be a Spectronics SPX 3620 fiber optic receiver and performs the functions of amplification of the signal from PHOTODIODE 25, linear automatic gain control, and conversion to digital signal levels. RECEIVER AMPLIFIER 26 can output a TTL level logic signal to RECEIVER INTERFACE LOGIC 27 where a clock signal is recovered. The data is then converted back to parallel format, decoded and strobed to PERIPHERAL 12.

Figure 5:
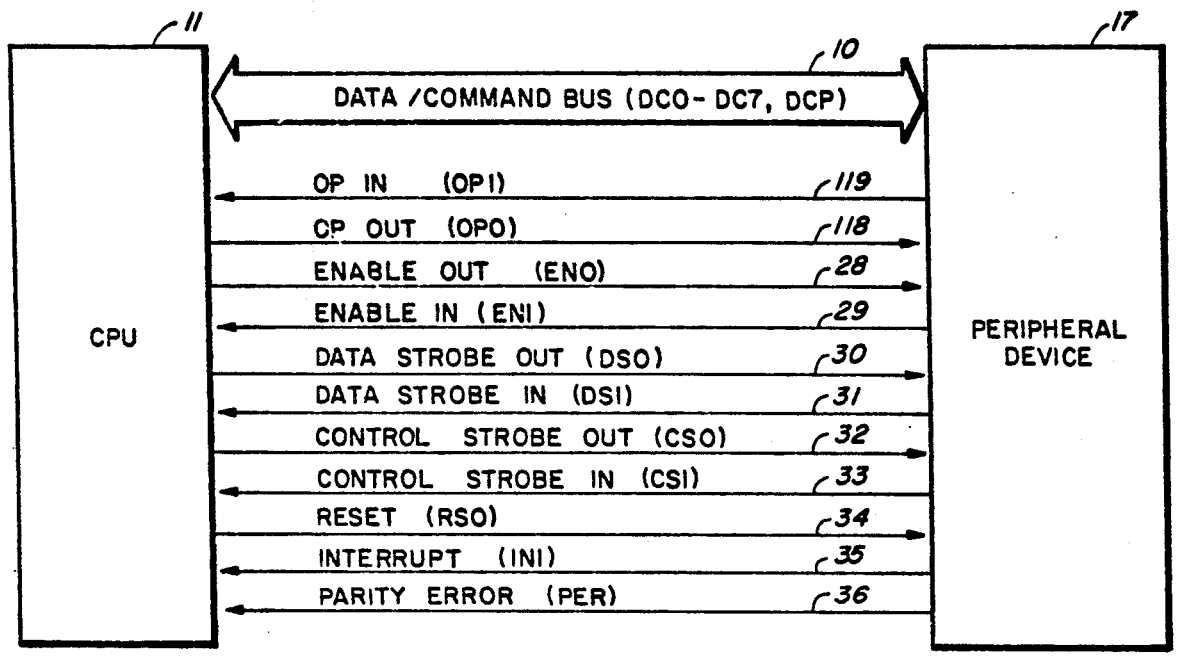
FIG. 5 is a more detailed drawing of the actual control lines involved in a typical CPU-peripheral link.

Referring now to FIG. 5, there is shown a more detailed drawing of the actual control lines involved in a typical CPU-peripheral link. The ENABLE OUT (ENO) signal on line 28 prepares the peripheral to receive data from the CPU. The ENABLE IN (ENI) signal on line 29 prepares the CPU to receive data from the peripheral and resets ENO. The DATA STROBE OUT (DSO) signal on line 30 indicates that data is being transferred on DATA BUS 10 and is set when the CPU has placed data on the DATA BUS. THE DATA STROBE IN (DSI) signal on line 31 indicates that data is being transferred on DATA BUS 10 from the PERIPHERAL to the CPU and is set when a peripheral places valid data on the DATA BUS. For transfers from the CPU to the peripheral, setting DSI indicates that the PERIPHERAL is ready to accept data from the CPU. The CONTROL STROBE OUT (CSO) signal on line 32 indicates a command or error information is being transferred on DATA BUS 10. CSO is set when the command is placed on the bus by the CPU. When commands are being sent from the PERIPHERAL to the CPU, CSO is set when the CPU is ready to accept the command. The CONTROL STROBE IN (CSI) signal on line 33 indicates a command or error information is being sent on the DATA BUS 10. CSI is set when the peripheral device senses a rise in CSO. The change is CSI indicates that the peripheral is ready to accept the command from the CPU. Likewise, when command or error information is being transferred from the PERIPHERAL to the CPU, CSI is set when the peripheral puts the information on DATA BUS 10. The PARITY ERROR signal (PER) on line 36 indicates that a parity error has occurred in the transmission of a command or data word. PER is set after the fall of the ENO signal in the dialogue used to report the parity error. The reset signal (RSO) on line 34 indicates the PERIPHERAL 17 is being initialized. This signal is set when the entire system is energized. The interrupt signal (INI) on line 35 indicates the PERIPHERAL needs servicing by the CPU 11. CPU 11 reacts to the signal by aborting the current dialog and interrogating the peripheral by way of a read instruction to determine what has caused the interrupt. The OP OUT (OPO) and OP IN (OPI) signals on lines 118 and 119 respectively function to indicate that the CPU is present and functioning (OPO) or that the peripheral is present and functioning (OPI).

Figure 6:
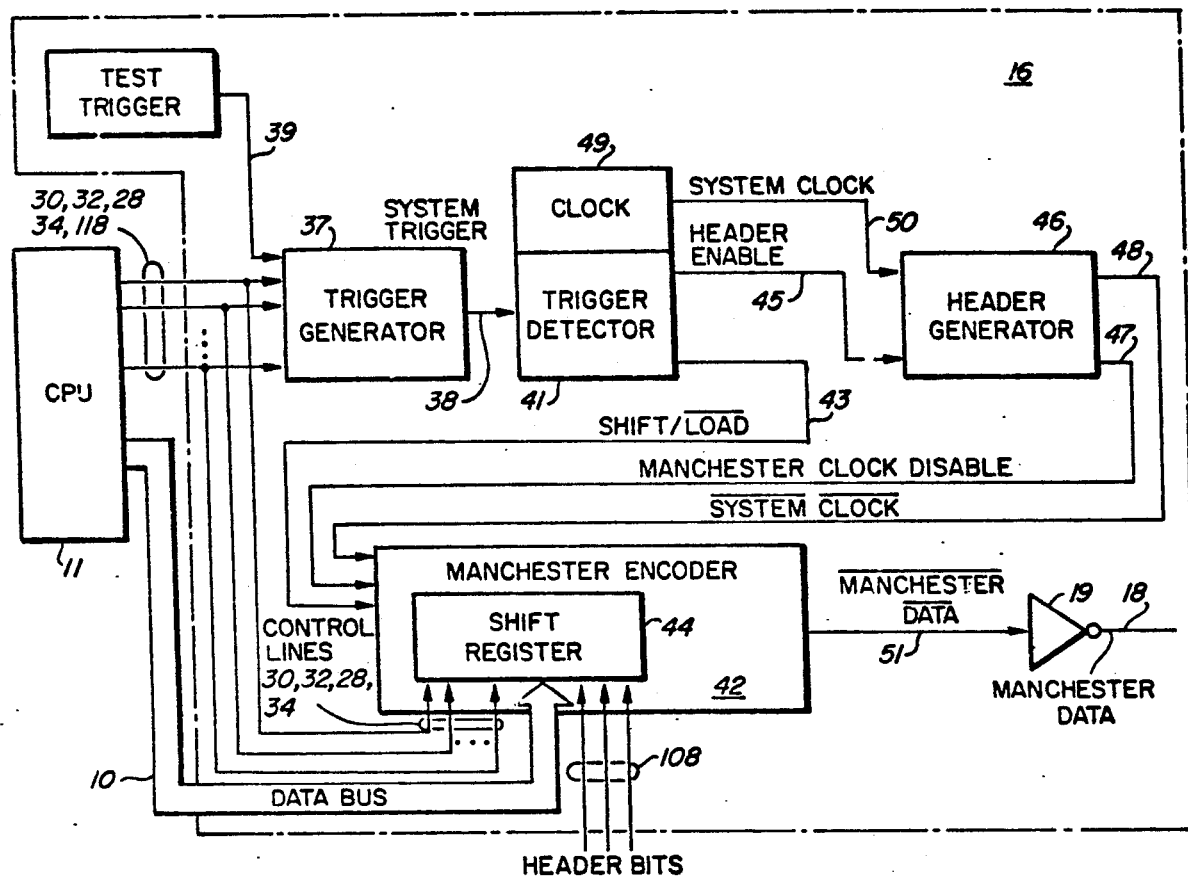
FIG. 6 is a block diagram of the transmitter interface logic.

FIG. 6 is a block diagram of TRANSMITTER INTERFACE LOGIC 16. One such transmitter is placed at the originating end of each unidirectional optical link. TRIGGER GENERATOR 37 monitors the control lines from the CPU or PERIPHERAL and generates a SYSTEM TRIGGER signal on line 38 whenever any of the monitored control lines change. The TRANSMITTER INTERFACE LOGIC 16 functions to take a "picture" of the data and control lines whenever there is such a change. The data thus sampled is then converted from serial to parallel format and encoded in Manchester code by TRANSMITTER INTERFACE LOGIC 16. It is the function of TRIGGER GENERATOR 37 to monitor control lines 30, 32, 28 and 34 to sense changes in these lines on the CPU side. On the peripheral side another TRIGGER GENERATOR for the TRANSMITTER INTERFACE LOGIC of the optical link for transfers from the PERIPHERAL 12 to CPU 11 would monitor control lines 29, 31, 33 and 35. SYSTEM TRIGGER is generated whenever one of these control lines makes either a positive or negative transition or a test control lines makes either a positive or negative transition or a test trigger input is received on line 39 from TEST TRIGGER GENERATOR 40. The TRIGGER GENERATOR 37 waits long enough for the control lines to become stable and then sends SYSTEM TRIGGER to TRIGGER DETECTOR 41.

TRIGGER DETECTOR 41 serves to receive this SYSTEM TRIGGER signal and to cause the parallel format loading of the data on the DATA BUS 10 and control lines 30, 32, 28, 34 at the CPU side. This loading occurs when TRIGGER DETECTOR 41 causes a predetermined change of $\overline{\text{SHIFT/LOAD}}$ to a logical zero state signal on line 43 followed by the next positive transition of SR CLOCK. TRIGGER DETECTOR 41 also enables a header signal to be generated by causing a predetermined change in a HEADER ENABLE signal on line 45. The header signal is transmitted over the optical link preceding the packet of serial format data to indicate to the PERIPHERAL or CPU at the receiving end that what follows the header signal is data.

HEADER GENERATOR 46 causes transmission of the header signal by causing a predetermined change in a MANCHESTER CLOCK DISABLE signal on line 47 upon detection of the predetermined change in the HEADER ENABLE signal on line 45. HEADER GENERATOR 46 also outputs a $\overline{\text{SYSTEM CLOCK}}$ signal on line 48 which is the inverted output of clock 49 in FIG. 6. Clock 49 could also be located in CPU 11 or peripheral 12. The function of the $\overline{\text{SYSTEM CLOCK}}$ signal is to coordinate logic functions in the transmitter and receiver interface logic.

Figure 13:
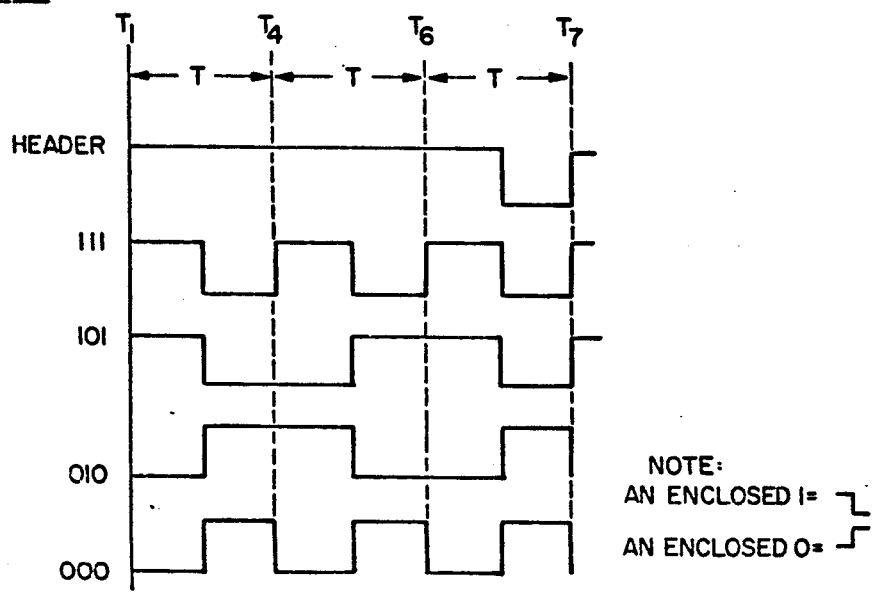
FIG. 13 is a comparison between the header waveform and all other combinations of three Manchester encoded bits.

MANCHESTER ENCODER 42 serves to convert the data from parallel to serial format and encode the data in Manchester code. MANCHESTER ENCODER 42 receives the data on DATA BUS 10 and control lines 30, 32, 28 and 34 in parallel format and stores it temporarily in SHIFT REGISTER 44 upon a predetermined change in the $\overline{\text{SHIFT/LOAD}}$ signal on line 43 and in sync with the clock. The first three bit positions (first three to be shifted out) of SHIFT REGISTER 44 are filled with three predetermined data bits on header bit lines 108. The logic levels on these lines are fixed and are those logic levels which yield the proper header signal depicted in FIG. 13 after the encoding process performed by MANCHESTER ENCODER 42. It is seen in FIG. 13 that the proper header is comprised of two non-return-to-zero code ones followed by a Manchester one.

MANCHESTER ENCODER 42 encodes the data stored in SHIFT REGISTER 44 by exclusive-ORing each bit as it is shifted out with a signal derived from the $\overline{\text{SYSTEM CLOCK}}$ signal i.e. MANCHESTER CLOCK. The data bits are shifted out in synchronization with the $\overline{\text{SYSTEM CLOCK}}$ signal, one bit being shifted out during each clock period. This exclusive-OR operation produces a data packet comprised of a header and string of a predetermined number of Manchester encoded data bits in serial format.

The header signal is created and transmitted preceding the data packet. It is created by performing the exclusive-OR operation on the first three predetermined data bits stored in SHIFT REGISTER 44 with the MANCHESTER CLOCK signal on line 1070 MANCHESTER CLOCK is generated when $\overline{\text{SYSTEM CLOCK}}$ on line 48 is disabled during the first two clock periods by the action of the MANCHESTER CLOCK DISABLE signal on line 47. The resulting MANCHESTER DATA signal on line 18 is comprised of the header followed by an arbitrary number of data bits. As the data is shifted out, SHIFT REGISTER 44 is filled with a continuous stream of logical ones. After the data packet has been shifted out, the link idles sending Manchester ones yielding a 50% duty cycle.

Figure 7A:
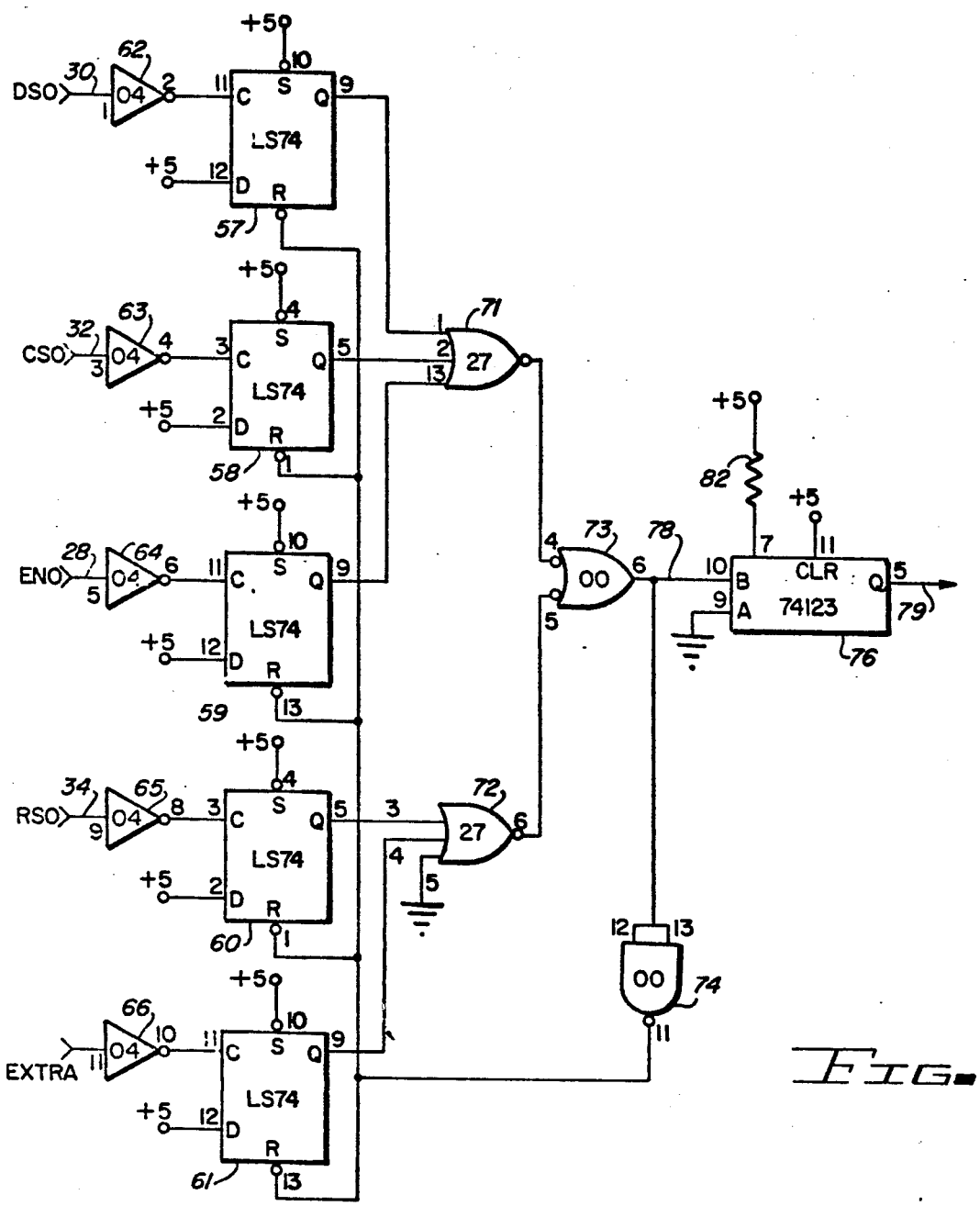
FIGS. 7A and 7B are logic diagrams of the trigger generator.
Figure 7B:
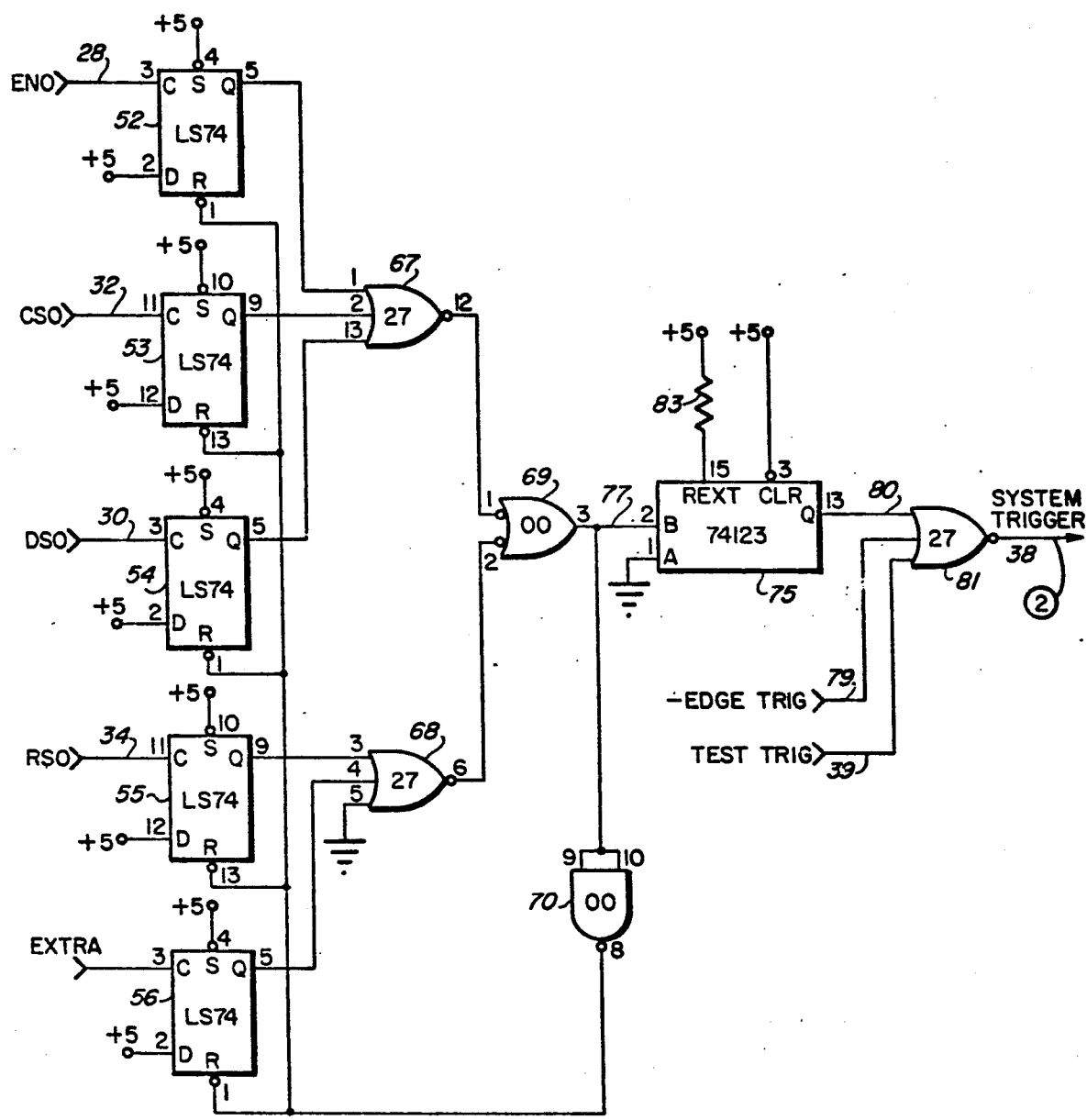

FIGS. 7A and 7B show a more detailed logic diagram of TRIGGER GENERATOR 37, and FIG. 8 is a timing diagram which shows the relationship between various signals within TRANSMITTER INTERFACE LOGIC 16 and the sytem clock. TRIGGER GENERATOR 37 works as follows. Control lines 28, 30, 32 and 34 carrying signals ENO, DSO, CSO and RSO, of the CPU are tied to the clock inputs of two groups of flip-flops. The first group of flip-flops, 52 through 56 shown in FIG. 7B, serve to detect rising edges on the monitored control lines. Likewise, flip-flops 57 through 61 in FIG. 7A detect falling edges on these control lines by the action of the inverters 62 through 66. Therefore, a positive transition on any of the monitored control lines clocks a logical one to the Q output of the flip-flop of flip-flops 52 through 56 monitoring that line whereas a negative transition will clock a one to the Q output of one of flip-flop 57 through 61.

For a positive transition, the one from the Q output of the monitoring flip-flop is fed back through gates 67 or 68 and 69 and 70 of FIG. 7B to the reset input of flip-flops 52 through 56. Likewise, for a falling edge change, the one from the Q output of the monitoring flip-flop would be fed back through gates 71 or 72 and 73 and 74 of FIG. 7A to the reset inputs of flip-flops 57 through 61. The resulting output pulses from gates 73 and 69 are used to trigger retriggerable monostable multivibrators 75 and 76 at their respective B inputs via lines 77 and 78.

The Q output of retriggerable monostable multivibrator 76 outputs a pulse of a predetermined duration called the EDGE TRIGGER signal on line 79 upon receipt of the pulse on line 78. This EDGE TRIGGER signal along with the output signal of retriggerable monostable multivibrator 75 on line 80 of FIG. 7B comprise two of the three inputs to NOR gate 81 in FIG. 7B. The third input is the TEST TRIGGER signal used for manually generating the SYSTEM TRIGGER signal on line 38. The circled number 2 pointing to line 38 indicates the waveform of the SYSTEM TRIGGER signal is shown at line 2 of FIG. 8. The SYSTEM TRIGGER signal on line 38 is a low going pulse and it occurs whenever either a rising edge or falling edge change occurs on the monitored control lines.

The duration of the SYSTEM TRIGGER pulse must be a certain minimum time. It is not desirable for SHIFT/$\overline{\text{LOAD}}$ to be sent until the control lines and DATA BUS lines have settled since incorrect data might otherwise be loaded into SHIFT REGISTER 44. Since SYSTEM TRIGGER is a low going pulse of a duration equal to the duration of the positive going pulse from either monostable multivibrator 75 or 76, the pulse duration of these monostables should be set to a time sufficiently long to allow settling of the data on the monitored data and control lines.

Sometimes a second transfer request is initiated by the CPU or PERIPHERAL before a previous transfer has been completed. In such a case, only the data as of the time of the second request is of any import, and the data of the incomplete first transfer request can be discarded. To insure that the data is settled before loading and that only the second transfer request causes loading, the pulse duration of monostables 75 and 76 is set by resistors 82 and 83 at a period three times that of the local clock or 150 nanoseconds for a clock frequency of 18.9 mhz in the preferred embodiment approximately a (50 nanosecond period). This period is selected to be longer than any of three delays. The first is the settling time of the monitored control and data lines. The delay must also be longer than the delay experienced by the transfer request as it propagates through the logic to monostables 75 and 76 so that a second transfer request will retrigger them before a header is sent. Finally, the period must also be longer than the time HEADER ENABLE (line 3 FIG. 8) is high (50 nanoseconds or one clock period) so that if a second transfer request occurs while HEADER ENABLE is high, HEADER ENABLE will be reset when it goes low causing another header to be sent (because only the rising edge of SYSTEM TRIGGER causes HEADER ENABLE to be set).

Figure 9:
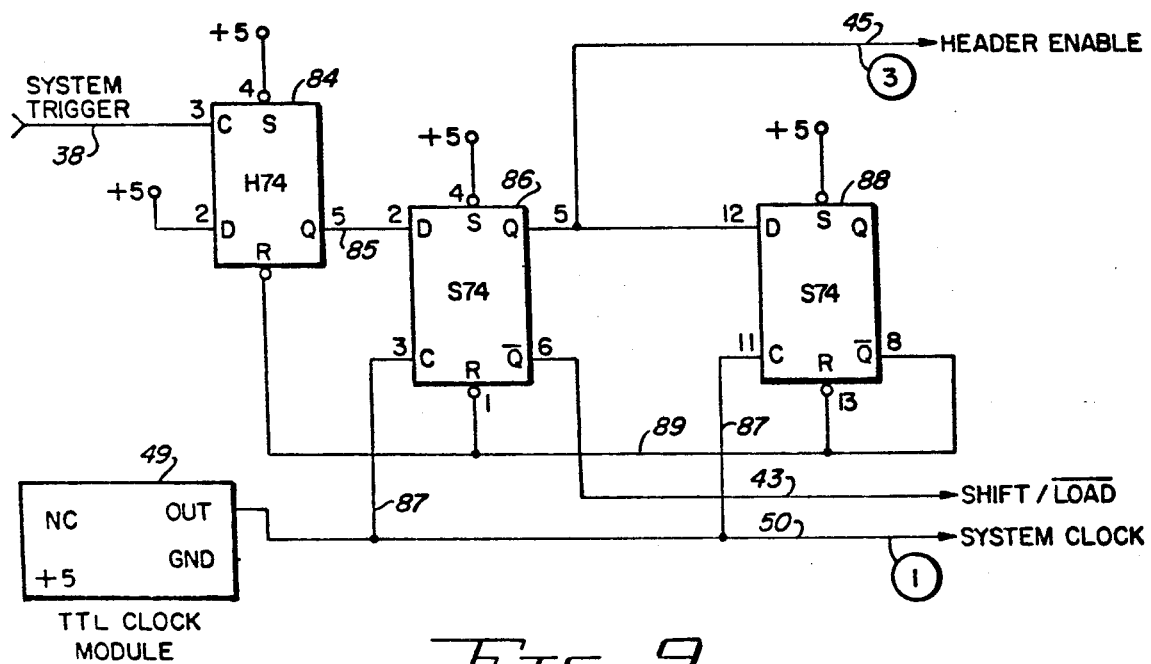
FIG. 9 is a logic diagram of the trigger detector.

FIG. 9 shows a logic diagram of TRIGGER DETECTOR 41. This unit serves to detect when the SYSTEM TRIGGER signal on line 38 has been sent and to initiate a transfer. The SYSTEM TRIGGER signal is fed to the clock input of flip-flop 84. This flip-flop is connected such that the positive transition of the SYSTEM TRIGGER signal clocks a logical one to its Q output on line 85. The logical one on line 85 holds the D input of flip-flop 86 in a high state. When the rising edge of the next clock pulse arrives on line 87 from clock 49, flip-flop 86 is set causing the HEADER ENABLE signal on line 45 to rise to the logical one state. This logical one on line 45 holds the D input of flip-flop 88 in the logical one state such that receipt of the rising edge of the next clock pulse on line 87 at the clock input of flip-flop 88 sets the Q output of 88 at logical one. Thus the $\overline{Q}$ output of flip-flop 88 drops to the logical zero state which is fed back to the reset inputs of flip-flops 84, 86 and 88 on line 89 resetting them. Thus flip-flop 86 is reset one clock period after it is set resulting in a HEADER ENABLE signal on line 45 having a duration of one clock period. The clock pulses are also fed to the HEADER GENERATOR (46 in FIG. 6) along line 50. The $\overline{Q}$ output of flip-flop 86 generates the SHIFT/$\overline{\text{LOAD}}$ signal and feeds it to the MANCHESTER ENCODER (42 in FIG. 6) along line 43. The function of SHIFT/$\overline{\text{LOAD}}$ will be explained more fully later.

Referring now to FIG. 8, it is seen that the SYSTEM TRIGGER signal, shown at line 2, is a low going pulse of a duration of approximately 150 nanoseconds. Line 3 shows that the HEADER ENABLE signal is a positive going pulse of one clock period duration which commences at the rising edge of the next clock pulse following the rising edge of the SYSTEM TRIGGER signal.

Figure 10:
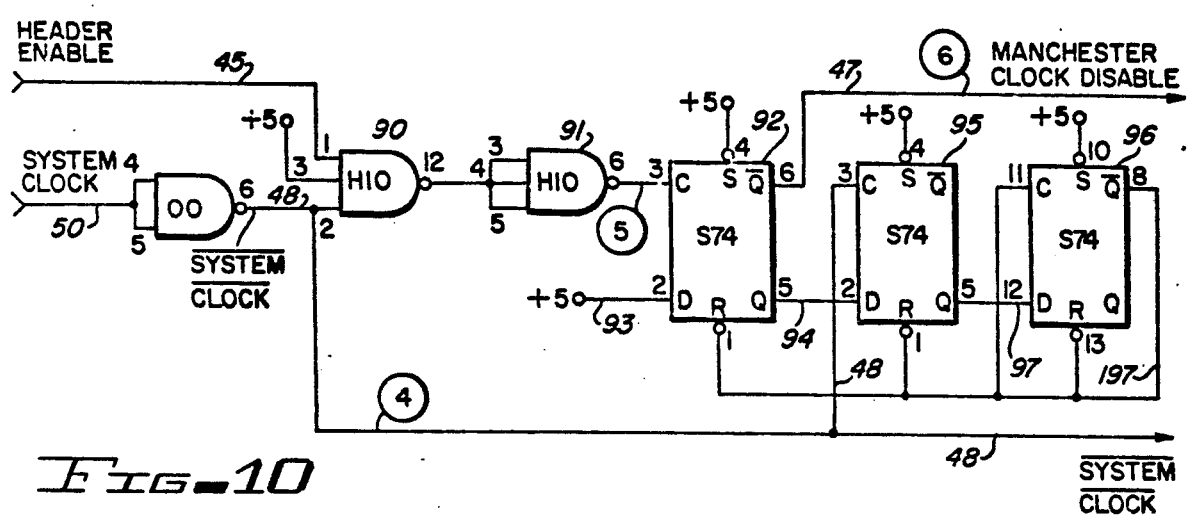
FIG. 10 is a logic diagram of the header generator in the transmitter interface logic.

FIG. 10 shows a logical diagram for HEADER GENERATOR 46. The HEADER ENABLE signal enters on line 45 and is one of the inputs to NAND gate 90. The other two inputs to NAND gate 90 are the SYSTEM CLOCK signal on line 48 and a constant logical one from a positive 5 volt power supply. The output of NAND gate 90 is inverted in NAND gate 91 resulting in the output pulse illustrated at line 5 of FIG. 8. This single clock pulse is sent to the clock input of flip-flop 92 during the time in which header enable is in the logical one state. Since the D input is held high by a 5 volt power supply connected to line 93 and the reset and clear inputs are high at the time this single clock pulse arrives, the positive transition of waveform 5 sets flip-flop 92 thereby lowering the MANCHESTER CLOCK DISABLE signal on line 47 from the $\overline{Q}$ output. The Q output of flip-flop 92 is connected to the D input of flip flop 95 by line 94. When flip-flop 92 is set the next positive transition of SYSTEM CLOCK will set flip-flop 95 since the reset and clear inputs of flop 95 are also high at this time.

The Q output of flip-flop 95 is connected to the D input of flip-flop 96 via line 97. The clock input of flip-flop 96 is connected to line 48 carrying the SYSTEM CLOCK signal. Therefore, when the Q output of flip-flop 95 goes high the next positive transition of SYSTEM CLOCK on line 48 will set flip-flop 96. The $\overline{Q}$ output of flip-flop 96 is connected to the reset inputs of flip-flops 96, 95, and 92 via line 97 so that all three flip-flops are reset when flip-flop 96 is set. When flip-flop 92 is reset, the MANCHESTER CLOCK DISABLE signal on line 47 returns to the logical one state after having been in the logical zero state for approximately two clock periods.

Figure 11:
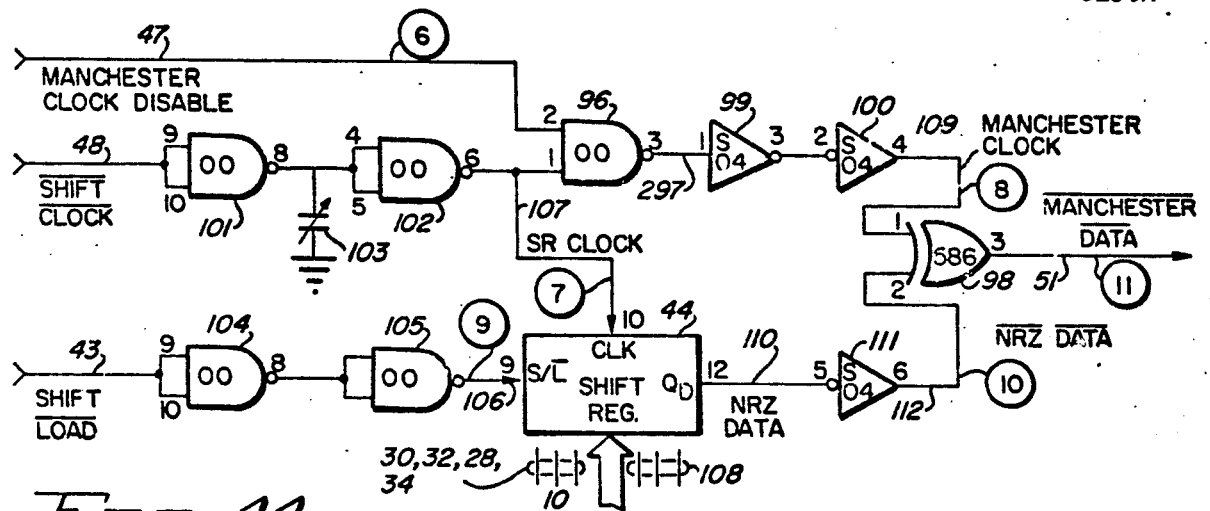
FIG. 11 is a logic diagram of the Manchester encoder 42.

FIG. 11 shows the logic diagram of MANCHESTER ENCODER 42. The function of MANCHESTER ENCODER 42 is to produce $\overline{\text{MANCHESTER DATA}}$ on line 51 by exclusive-ORing the output of SHIFT REGISTER 44 with the MANCHESTER CLOCK signal on line 109. The SYSTEM CLOCK signal on line 48 (illustrated at line 4 of FIG. 8) must be modified by the MANCHESTER CLOCK DISABLE signal on line 47 in order to produce the MANCHESTER CLOCK signal which is used to produce the header. Recall that MANCHESTER CLOCK DISABLE on line 47 (line 6 of FIG. 8) is a low going pulse that stays low for two clock periods.

Figure 12:
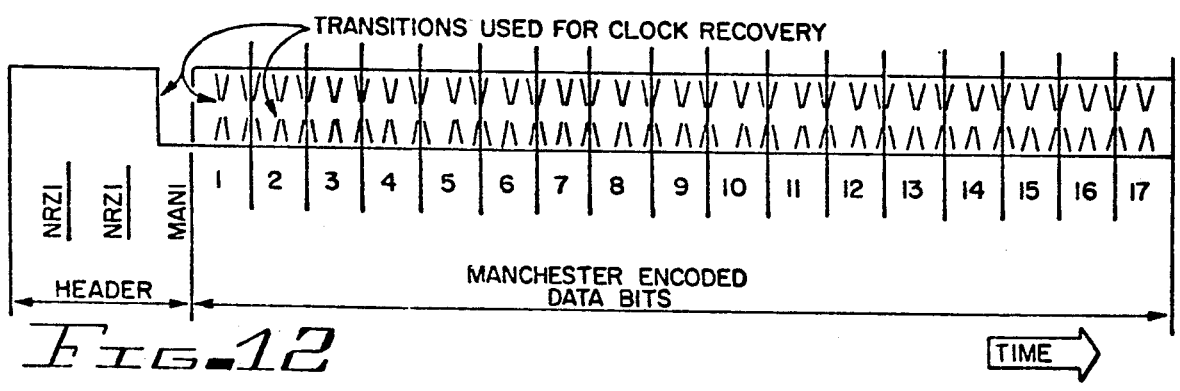
FIG. 12 is a drawing showing the format of the header followed by a data packet comprising an arbitrarily selected number of data bits in the snapshot of the control and data lines.

Referring now to FIG. 12, there is shown a drawing of the header followed by a packet of manchester encoded data. It is seen that the header is comprised of two non-return-to-zero coded logical ones followed by a Manchester coded logical one. Recall that in non-return to zero code a logical one is represented by a high logical level during an entire clock period whereas in Manchester code, a logical one is represented by negative transition during the middle of a clock period T.

Referring now to FIGS. 11 and 8, the MANCHESTER CLOCK signal is produced by passing the SR CLOCK signal on line 107 through NAND gate 96 with the other input of NAND gate 96 being the MANCHESTER CLOCK DISABLE signal on line 47. The resultant output signal on line 97 stays high as long as the MANCHESTER CLOCK DISABLE signal on line 47 is a logical zero which it is for approximately two clock periods (see lines 4, 6, 7 and 8 of FIG. 8). However, when MANCHESTER CLOCK DISABLE returns to the high state (at time $T_9$ in FIG. 8), the output signal on line 97 is the SR CLOCK signal inverted (line 7 of FIG. 8) on line 107. Thus the SR CLOCK signal is effectively prevented from reaching exclusive-OR gate 98 while MANCHESTER CLOCK DISABLE is in the logical zero state. Inverters 99, 100, NAND gates 101 and 102 (connected as inverters) and capacitor 103 are inserted for delay reasons which will be explained more fully later.

The SHIFT/LOAD signal on line 43 is passed through two NAND gates 104 and 105 connected as inverters for delay purposes (to be explained later), and enters the S/L input 106 of SHIFT REGISTER 44. The SYSTEM CLOCK signal on line 48 is delayed by gates 101 and 102 and capacitor 103 and becomes the SR CLOCK signal on line 107. SHIFT REGISTER 44 has parallel inputs for control lines 30, 32, 28 and 34 data bus 10 and header bits 108. Parallel loading of these interface lines is accomplished at the next positive transition of SR CLOCK after the SHIFT/LOAD signal at input 106 is taken low (time $T_1$ in FIG. 8). During this loading, no serial data flow out of the SHIFT REGISTER 44 can occur. Shifting is accomplished synchronously after the SHIFT/LOAD signal at 106 is taken high. With SHIFT/LOAD high, each positive transition of the SR CLOCK signal on line 107 will cause one bit to be shifted out as the NRZ DATA signal on line 110 (shift occurs at times $T_4$ and $T_6$ in FIG. 8). This NRZ DATA signal is inverted in inverter 111 and becomes the $\overline{\text{NRZ DATA}}$ signal on line 112 to exclusive-OR gate 98. The $\overline{\text{NRZ DATA}}$ signal is illustrated on line 10 of FIG. 8.

Figures 13A, 14:
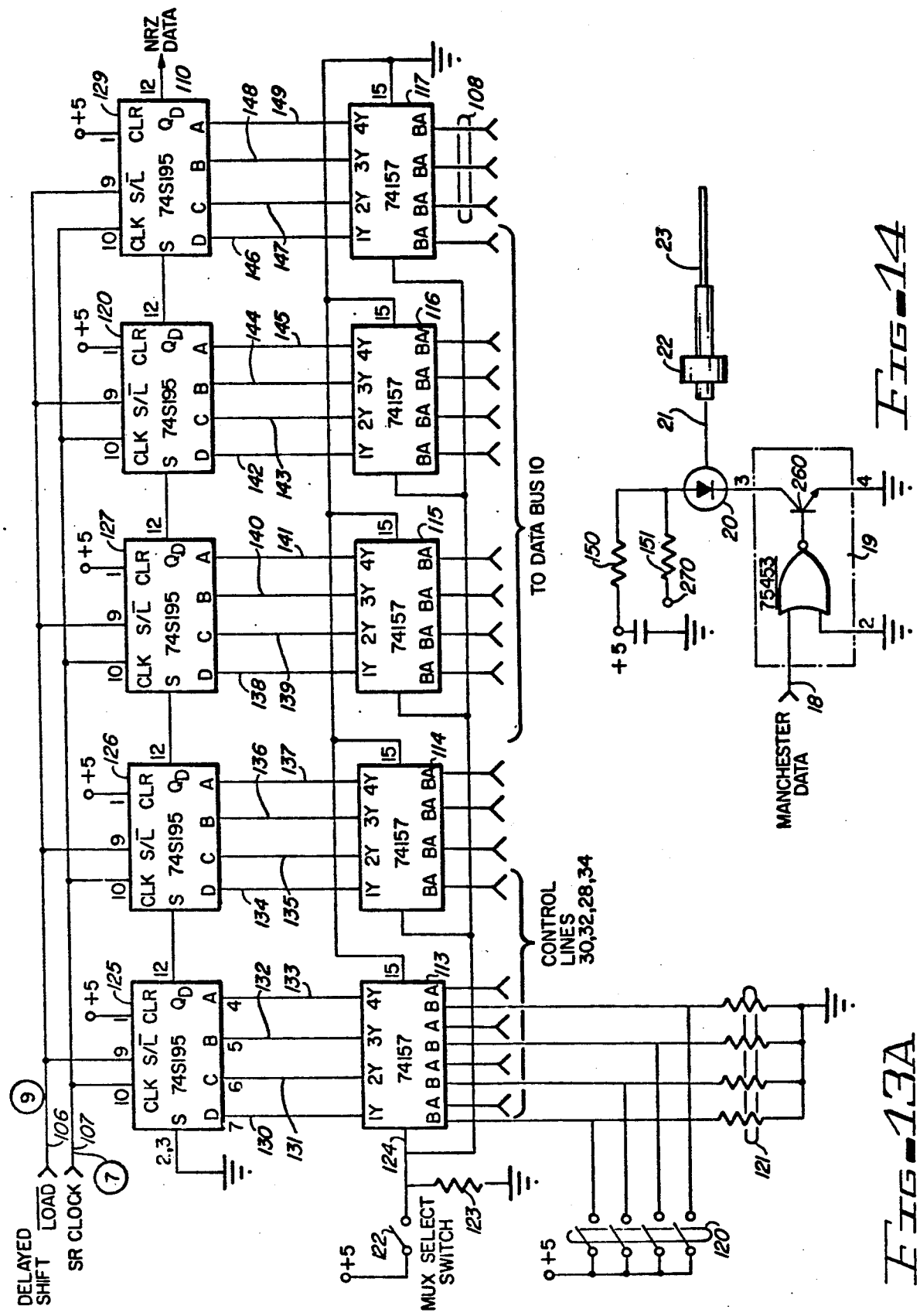
FIG. 13A is a logic diagram of shift register 44.
FIG. 14 is a schematic diagram of source driver 19.

Referring now to FIG. 13A, there is shown a logic diagram of SHIFT REGISTER 44. Two line multiplexers 113 through 117 serve to select either the signals on the A lines or those signals on the B lines. The twenty A lines are connected to header bits 108, data bus 10, and control lines 30, 32, 28 and 34 at the CPU side. The B lines are connected to a number of switches 120 and resistors 121. For convenience, these switches and resistors are drawn only for multiplexer 113 although they exist for multiplexers 114 through 117 also. Switches 120 and resistors 121 allow manually selected data patterns to be entered into the shift register for purposes of testing the optical link system. MUX select switch 122 and resistor 123 serve to take the multiplex select input 124 either high or low thereby causing two lines multiplexers 113 through 117 to transfer the data on the A lines to the outputs when the select input 124 is low, but to transfer the data on the B lines to the outputs when the select input 124 is high. Multiplexer output lines 130 through 149 serve to transfer the data taken from either the A lines or the B lines to the parallel loading input lines of the shift register. As noted above, parallel loading of the data on lines 130 through 149 into the shift register occurs when the DELAYED SHIFT/LOAD signal on line 106 (line 9 of FIG. 8) is taken low and the next positive transition of the SR CLOCK signal on line 107 occurs (time $T_1$ in FIG. 8 because of the delay time $T_{PLH}$ of SHIFT REGISTER 44 in responding to the positive transition of SR CLOCK).

The header is generated as follows. Referring to FIGS. 6, 8, 11 and 12, it is seen that to generate the two non-return-to-zero coded logic ones and the Manchester coded logic zero of the header of FIG. 12, the $\overline{\text{MANCHESTER DATA}}$ signal on line 51 of FIG. 11 must be the inverse signal. This is so because SOURCE DRIVER 19 in FIG. 6 inverts the signal in placing it on the optical cable. Therefore, the $\overline{\text{MANCHESTER DATA}}$ signal must be at the logical zero level for the first two and one half clock periods of the header and must make a transition from logical zero to logical one in the middle of the third clock period of the header transmission.

To accomplish this waveform for $\overline{\text{MANCHESTER DATA}}$, the first two bits loaded into SHIFT REGISTER 44 via lines 108 in FIG. 13 are logical zeros and the third bit is a logical one. Thus at time $T_1$ in FIG. 8 a logical zero is on line 110 in FIG. 11 indicated by a logical one on line 10 of FIG. 8 from time $T_1$ to $T_4$. The first clock period of the header transmission is from $T_1$ to $T_4$ in FIG. 8 which corresponds to the period from $T_0$ to $T_3$ for the SR CLOCK signal (line 7 of FIG. 8). The delay $T_{PLH}$ is the response time of SHIFT REGIS- TER 44 to the SR CLOCK signal. The second clock period of the header transmission is from $T_4$ to $T_6$ and the third clock period is from $T_6$ to $T_7$ in FIG. 8.

The first bit of the header, during time $T_1$ to $T_4$, results when a logical zero is loaded into the first bit position via line 149 in FIG. 13A. This logical zero appears at the $Q_D$ output connected to line 110. This loading and appearance of the logical zero on line 110 occurs at time $T_1$ in FIG. 8. DELAYED SHIFT/$\overline{\text{LOAD}}$ goes low at time $T_{10}$ and the next positive transition of SR CLOCK causing the loading to occur happens at time $T_0$. The additional delay $T_{PLH}$ between times $T_0$ and $T_1$ is caused by the internal delay of SHIFT REGISTER 44 in responding to the positive transition of the SR CLOCK signal. With a logical zero on line 110 from $T_1$ to $T_4$, the $\overline{\text{NRZ DATA}}$ signal (line 112 in FIG. 11, line 10 in FIG. 8) seen by exclusive-OR gate 98 is a logical one. At the same time, the other input to the exclusive-OR gate, MANCHESTER CLOCK, (line 8 of FIG. 8) is a logical one. The exclusive-OR of these two inputs, $\overline{\text{MANCHESTER DATA}}$ is a logical zero as seen at line 11 of FIG. 8. After inversion in SOURCE DRIVER 19, a logical one will be sent out over the fiber optic cable during the first header bit clock period.

The second header bit is generated in much the same way. At time $T_2$, DELAYED SHIFT/$\overline{\text{LOAD}}$ returns to a logical one level. Thereafter at every positive transition of SR CLOCK (line 7 FIG. 8) a bit is shifted out of SHIFT REGISTER 44. The second bit of the predetermined header bits fed to SHIFT REGISTER 44 via lines 108 is also a logical zero. At time $T_4$, this logical zero is shifted right and appears at output line 110. Again the delay between $T_3$ and $T_4$ is due to delay in responding to the SR CLOCK signal. Thus from time $T_4$ to $T_6$, the $\overline{\text{NRZ DATA}}$ signal seen by exclusive-OR gate 98 is a logical one. The MANCHESTER CLOCK signal is a logical one during this same time interval. With two logical ones at its input, exclusive-OR gate 98 outputs a logical zero.

The third header bit must be a Manchester encoded logical one which is a negative transition from a logical one to a logical zero in the middle of the clock period. The third header bit clock period is from $T_6$ to $T_7$ in FIG. 8. A logical one was loaded into the third bit position of SHIFT REGISTER 44 by lines 108 and 147 and, at time $T_6$, it is shifted to the output line 110. Therefore, $\overline{\text{NRZ DATA}}$ drops to logical zero at time $T_6$. MANCHESTER CLOCK also drops to logical zero at time $T_6$ so exclusive-OR gate 98 sees two logical zeros at its inputs causing a logical zero at its output. However, at time $T_8$, a time midway between times $T_6$ and $T_7$, MANCHESTER CLOCK returns to a logical one level causing $\overline{\text{MANCHESTER DATA}}$ to rise to the logical one level. This completes transmission of the header.

During the clock periods of the SR CLOCK signal following the header, the data packet of Manchester encoded data bits are sent over the optical fiber by the exclusive-ORing of MANCHESTER CLOCK with $\overline{\text{NRZ DATA}}$. Suppose, for example, that during the fourth clock period, $T_7$ to $T_{11}$, a logical one was to be sent. At time $T_7$, this logical one would be shifted out of the shift register and would appear on line 110. $\overline{\text{NRZ DATA}}$ would remain at zero from time $T_7$ to $T_{11}$. However, at time $T_{12}$, midway between $T_7$ and $T_{11}$, MANCHESTER CLOCK would rise to the logical one level causing $\overline{\text{MANCHESTER DATA}}$ to rise from logical zero to one. Thus a positive transition from logical zero to logical one (an inverted Manchester one) would occur at time $T_{12}$. After SOURCE DRIVER 19 inverts this positive transition, a proper Manchester one will have been sent. The remaining data bits are sent in a similar manner.

In order to ensure proper functioning of the Manchester encoder logic illustrated in FIG. 11, certain delays must be imposed. In the preferred embodiment, these delays are imposed by the use of additional gates. For example, the NANDing of the MANCHESTER CLOCK DISABLE and SR CLOCK signals by gate 96 in FIG. 11 can produce unwanted shortened clock pulses in the MANCHESTER CLOCK signal if the two inputs to NAND gate 96 do not arrive at the appropriate instant in time. By adding a pair of NAND gates 101 and 102 in the path of the SR CLOCK signal on line 48, it is possible to ensure that the MANCHESTER CLOCK DISABLE signal makes the transition from logical one to logical zero while the SR CLOCK signal is in the logical zero state. The delay varies from chip to chip so the number of gates used may vary in different applications. Capacitor 103 serves to fine tune the delay. The effect of these gates is illustrated in connection with the SR CLOCK signal shown at line 7 of FIG. 8. Gates 101 and 102 are made necessary by the delays caused by gates 90 and 91 and flip-flop 92 in the HEADER GENERATOR (FIG. 10).

The loading of SHIFT REGISTER 44 must be done in synchronization with the SR CLOCK signal. Parallel loading occurs at the positive transition of the first SR CLOCK pulse following the lowering of the SHIFT/$\overline{\text{LOAD}}$ signal. To ensure that the SHIFT/$\overline{\text{LOAD}}$ signal is raised and lowered while the SR CLOCK signal is in a logical zero state, delaying gates 104 and 105 are inserted in line 43 of FIG. 11. Gates 104 and 105 equalize the delay caused by gates 101 and 102. The effect of these gates is illustrated on line 9 of FIG. 8.

A small delay, $T_{PLH}$, occurs between the time the SR CLOCK signal on 107 goes through a positive transition and the time that a bit actually occurs at the output of SHIFT REGISTER 44 on line 110. A further delay occurs in inverter 111 such that the $\overline{\text{NRZ DATA}}$ signal on line 112 arrives at exclusive-OR gate 98 some time after the positive transition of the SR CLOCK signal on line 107. Since the exclusive-OR gate 98 must compare the $\overline{\text{NRZ DATA}}$ signal on line 112 to the MANCHESTER CLOCK signal on line 109 precisely at the same time, some additional delay must be imposed upon the SR CLOCK signal as it propagates through NAND gate 96 toward exclusive-OR gate 98 to compensate for the $T_{PLH}$ and inverter 111 delay. Inverters 99 and 100 serve the purpose of adding the additional delay. The effect of inverters 99 and 100 is illustrated at line 8 of FIG. 8.

The header must be unique so that it may be distinguished from data. In FIG. 13, the header waveform is shown in relation to all of the possible combinations of three manchester encoded data bits. It is seen that no combination of Manchester bits maintains a logical state for more than one two and a half clock period. Thus the receiving end of the optical link, by monitoring for a logical one level of greater duration than one clock period, can tell when a header has been sent.

FIG. 14 shows a schematic diagram of SOURCE DRIVER 19. The $\overline{\text{MANCHESTER DATA}}$ signal on line 51 drives SOURCE DRIVER 19, which can be a Texas Instruments 75453 line driver. This line driver consists of a NOR gate with one input grounded thereby effectively inverting the MANCHESTER DATA signal. Its output drives the base of an internal output transistor 260 the collecter of which is connected to a 5 volt power supply through a resistor 150 and OPTICAL SOURCE 29 which can be a light emitting diode. Resistor 150 limits the current through the LED. The resulting light pulses from LED 20 are connected to OPTICAL CONNECTOR 22 and FIBER OPTIC CABLE 23 by PIGTAIL 21 or some equivalent means. Resistor 51 is used for testing the transmitter without using LED 20 by connecting the collector of the output transistor 260 to this resistor at point 270 to serve as its load.

Figures 15, 16, 17:
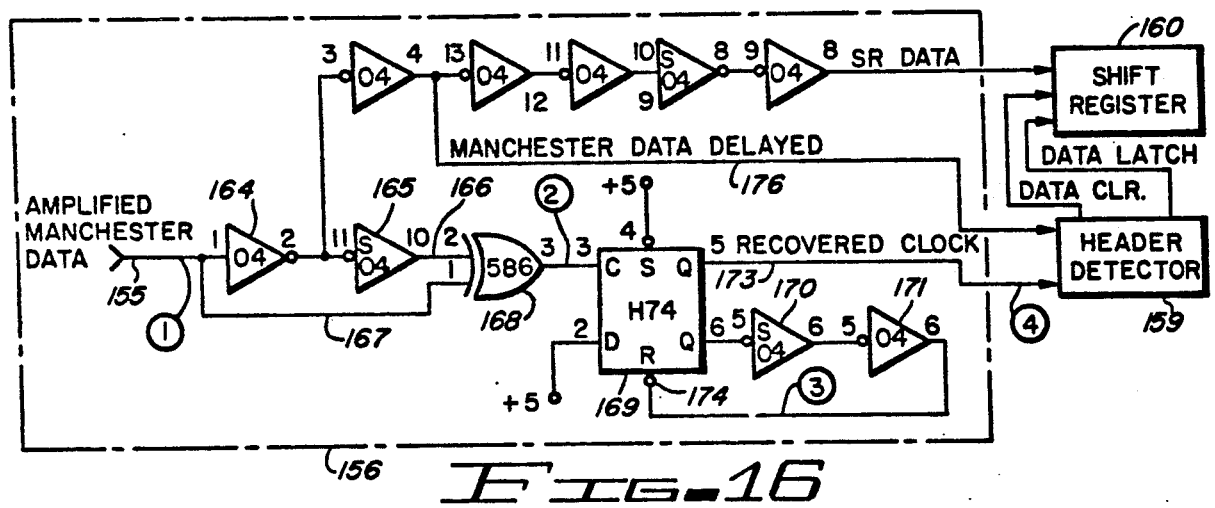
FIG. 15 is a block diagram of receiver interface logic 27.
FIG. 16 is a logic diagram of the clock generator.
FIG. 17 is a timing diagram for the clock recovery.

FIG. 15 is a block diagram of the RECEIVER INTERFACE LOGIC 27 the function of which is to receive the RECEIVED MANCHESTER DATA signal from PHOTODIODE 25 and to convert it to a digital parallel format and decode it for use by PERIPHERAL DEVICE 12. Incoming light pulses from FIBER OPTIC CABLE 23 strikes photodiode 25 (RCA C30808 or equivalent) which converts them into a RECEIVED MANCHESTER DATA signal on line 300. An RCA PIN diode was selected over an avalanche diode because avalanche diodes require reverse bias voltages of 100 volts or more, whereas a PIN diode needs less reverse bias. This bias voltage is applied by power supply 153.

The Manchester encoded data of the AMPLIFIED MANCHESTER DATA signal is sent to CLOCK GENERATOR 156. The function of this circuit is to recover the SYSTEM CLOCK signal that is encoded in the AMPLIFIED MANCHESTER DATA signal. CLOCK GENERATOR 156 has three outputs: the MANCHESTER DATA DELAYED signal on line 157 to transfer the encoded Manchester data through CLOCK GENERATOR 156; the RECOVERED CLOCK signal on line 158 for synchronizing logic operations by RECEIVER INTERFACE LOGIC 27; and the SR DATA signal on line 161 which is a delayed version of the MANCHESTER DATA DELAYED signal and provides the data to be shifted into SHIFT REGISTER 160 serially for format conversion.

The RECOVERED CLOCK and MANCHESTER DATA DELAYED signals are sent to HEADER DETECTOR 159 which serves to sense when the header has been sent. The MANCHESTER DATA DELAYED signal is used by HEADER DETECTOR 159 to determine when a header has been sent. This is done by detecting when a logical one level has been maintained in the MANCHESTER DATA DELAYED signal for longer than one clock period of the RECOVERED CLOCK signal. When a header has been sent, the clock pulses of the RECOVERED CLOCK signal are allowed to reach SHIFT REGISTER 160 as the DATA CLOCK signal on output line 162 from HEADER DETECTOR 159. When the RECOVERED CLOCK signal is gated through to SHIFT REGISTER 160, loading of the serial format data bits of the SR DATA signal by SHIFT REGISTER 160 begins. One bit is loaded for each clock period of the DATA CLOCK signal until seventeen data bits and one header bit have been loaded as indicated by a bit counter. The bit counter is wired to count up to whatever number of data bits there are in the data packet plus one. When the desired number of bits have been loaded, HEADER DETECTOR 159 sends a DATA LATCH signal to SHIFT REGISTER 160 causing it to latch the data into storage buffers for parallel format access on the interface lines to PERIPHERAL 12.

In the event an entire word is not received before another header is detected, the data that has been collected is discarded, and the data bits following the second header are accepted.

FIG. 16 is a logic diagram of the CLOCK GENERATOR 156 and FIG. 17 is a timing diagram for the clock recovery process. The CLOCK GENERATOR uses the transitions of the encoded data comprising the AMPLIFIED MANCHESTER DATA signal on line 155 to recover the clock. Each transition the data makes is converted into a short pulse by exclusive-ORing the encoded data with itself delayed 15 nanoseconds in time. Some other delay period may work as well. Inverters 164 and 165 serve to delay the AMPLIFIED MANCHESTER DATA signal on line 155 for input to one input of exclusive-OR gate 168 whereas line 167 carries the non-delayed AMPLIFIED MANCHESTER DATA signal to the other input of exclusive-OR gate 168. The MANCHESTER DATA signal is illustrated on line 1 of FIG. 17. Line 2 of FIG. 17 illustrates the pulses which leave exclusive-OR gate 168. Each pulse has a duration equal to the delay selected, i.e. 15 nanoseconds in this case, and occurs commencing at the time of each transition of the data in the AMPLIFIED MANCHESTER DATA signal. The Manchester one of the header is used to insure that the first pulse 170 that clocks flip-flop 169 occurs in the middle of a bit period. This pulse causes the Q output of flip-flop 169 to be set at a logical one. The logical zero which appears at the $\bar{Q}$ output is fed back to the reset line of flip-flop 169 through delay inverters 170 and 171. In FIG. 17, the time interval between times $T_{20}$ and $T_{21}$ indicate the delay in flip-flop 169 between receipt of the positive transition of pulse 172 and the rise at the Q output of flip-flop 169 connected to line 173. The time interval between times $T_{21}$ and $T_{22}$ indicates the time it takes the logical zero at the $\bar{Q}$ output of flip-flop 169 to propagate through inverters 170 and 171 to the reset input 174 of flip-flop 169. The time interval between times $T_{22}$ and $T_{23}$ indicates the delay between arrival of the logical zero at the reset input resetting flip-flop 169 and corresponding arrival of the logical one from the $\bar{Q}$ output of flop 169 resulting from this resetting event. Inverters 170 and 171 delay the reset pulse such that if another pulse from gate 168 occurs at the start of the next clock period, as does pulse 175 in FIG. 17 line 2, flip-flop 169 is not set because reset input 174 is held in the reset condition (logical zero) by the time delays imposed by inverters 170 and 171 till a time just before the midpoint of the next clock period. Thus flip-flop 169 can be set only by the pulses which emit from exclusive-OR gate 168 in the middle of each clock period. The signal from the Q output of flip-flop 169 on line 173 is called RECOVERED CLOCK and is illustrated at line 4 of FIG. 17.

Line 300 is a delayed output for outputting a delayed version of the AMPLIFIED MANCHESTER DATA signal. This signal is delayed by a first predetermined delay by inverter 301 and sent out on line 157 as the MANCHESTER DATA DELAYED signal. Inverters 302–305 serve to impose a second predetermined delay upon said MANCHESTER DATA DELAYED signal and sends it out on line 161 as the SR Data signal. The purpose of these delays is to synchronize the SR Data, MANCHESTER DATA DELAYED, and Recovered Clock signals. The delays imposed in the exclusive-OR gate 168, flip-flop 169 and HEADER DETECTOR 159 in processing signals for use by shift register 160 are counter balanced by inverters 301-305 such that all signals necessary to proper operation of shift register 160 arrive in the proper timing relationships.

Figure 18:
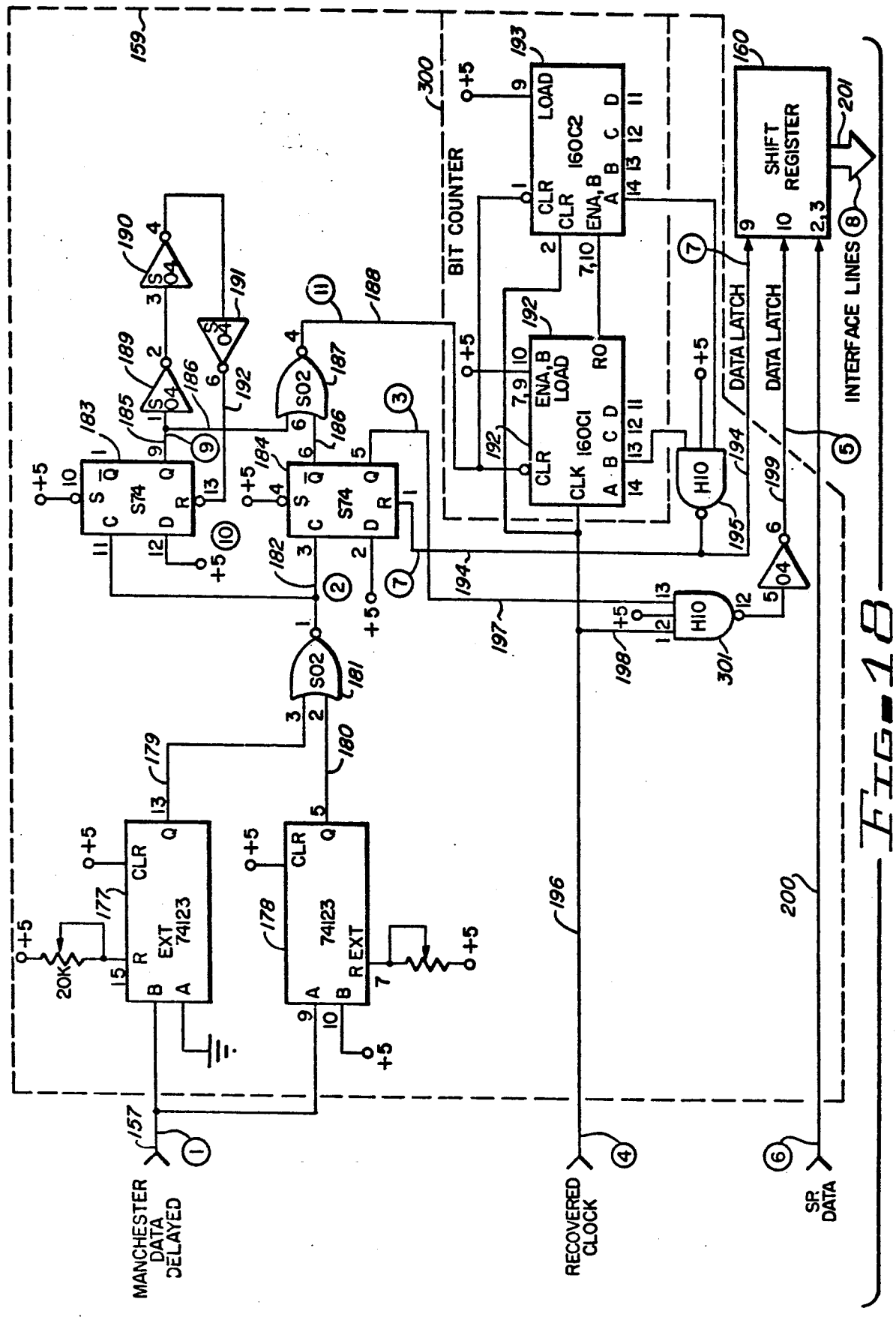
FIG. 18 is a logic diagram of the header detector.

With reference to FIG. 18, the operation of the HEADER DETECTOR 159 will be explained. The MANCHESTER DATA DELAYED signal on line 157 (illustrated on line 1 of FIG. 19A) is used to clock two retriggerable monostable multivibrators 177 and 178. One of these monostables is triggered on the rising edges of the MANCHESTER DATA DELAYED signal and the other is clocked on the failing edges. The pulse duration for each monostable multivibrator 177 and 178 is the same and is adjusted such that the outputs on lines 179 and 180, when combined by NOR gate 181, keep line 182 in the logical zero state as long as Manchester encoded data is being received. The signal on line 182 is illustrated at line 2 of FIG. 19A. There it is seen that when a header is received, the MANCHESTER DATA DELAYED signal remains in the logical one state for a period of time longer than the period of the monostable multivibrators 177 and 178. Since both monostables then have the opportunity to time out, NOR gate 181 will receive two zeros at its inputs causing line 182 to rise to the logical one state. The signal on line 182 is illustrated at line 2 of FIG. 19A. When line 182 rises, flip-flop 184 is clocked sending a logical zero from the Q output over line 186 to NOR gate 187. The positive transition on line 182 also sets flip-flop 183 which sends a logical one from its Q output over line 185 to NOR gate 187. This combination of a logical one and a logical zero at the input of NOR gate 187 causes output line 188 to go low which clears counters 192 and 193 of the bit counter 300 to zero. The Q output of flip-flop 183 on line 185 is illustrated at line 9 of FIG. 19B. The logical one from the Q output of flip-flop 183 on line 185 also propagates through delay inverters 189, 190 and 191 and arrives inverted at the reset input of flip-flop 183 a short time after that flip-flop is set (see line 10 of FIG. 19B). When flip-flop 183 is reset, its Q output goes low and NOR gate 187 sees two logical zeros at its input thereby raising line 188 to a logical one (line 11 FIG. 19B). Counting is enabled when line 188 returns to logical one state. Flip-flop 183 serves to reset bit counter 300 if a second header is received before a transfer has been completed.

Figure 19A:
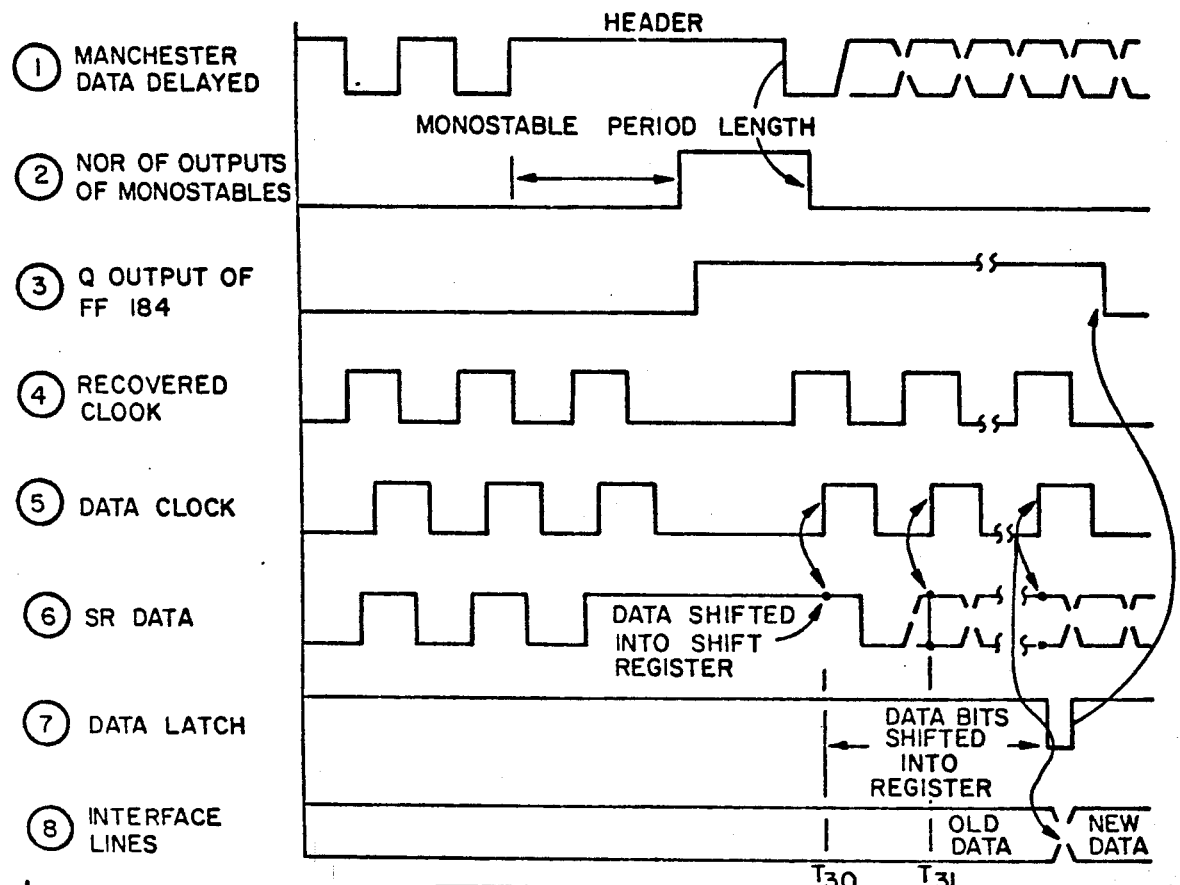
FIGS. 19A and B are a timing diagram for the header detector and shift register of the receiver interface logic.
Figure 19B:
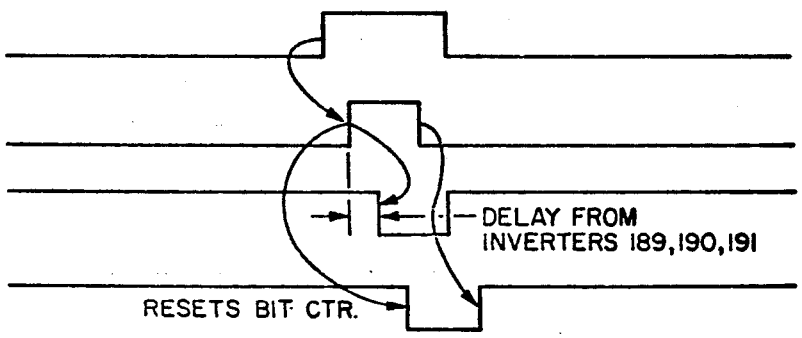

The purpose of bit counter 300 is to count out the number of clock periods corresponding to the number of data bits in the packet plus one following the receipt of a header so that the DATA LATCH signal on line 194 may be generated after the data bits have been shifted into SHIFT REGISTER 160. Bit counter 300 counts the clock periods of the RECOVERED CLOCK signal (line 4 FIG. 19A) on line 196. FIG. 19A shows that the RECOVERED CLOCK signal becomes active at the time of the downward transition of the header.

When bit counters 192 and 193 reach the required count, (18 in this case) the B output of counter 192 and the A output of counter 193 go high. This drives the output of NAND gate 195 to logical zero which resets flip-flop 184 via line 194. This low going pulse constitutes the DATA LATCH signal on line 194 illustrated at line 7 of FIG. 19A. When flip-flop 184 is reset, the $\overline{Q}$ output on line 186 rises to logical one which causes NOR gate 187 to lower line 188 to disable further counting.

During the time flip-flop 184 is set, the Q output on line 197 (line 3 FIG. 19A) is in the logical one state. This allows the RECOVERED CLOCK signal on line 196 to propagate through NAND gate 301 to SHIFT REGISTER 160 via lines 198 and 199 as the DATA CLOCK signal. Thus it is seen that the DATA CLOCK signal, illustrated at line 5 of FIG. 19A, is active from the end of the header until bit counter 300 reaches a count of eighteen resetting flip-flop 184. While the DATA CLOCK signal is active, SHIFT REGISTER 160 shifts in one bit of the SR DATA signal per clock period. In FIG. 19A, the first data bit following the header is shifted in at time $T_{30}$ and the second data bit at time $T_{31}$ and so on for sixteen more data bits. When the DATA LATCH signal on line 194 goes low after eighteen bits have been shifted into SHIFT REGISTER 160, the data that has been shifted in serially is strobed in parallel fashion into a set of data latches. These latches drive a series of interface line buffers which drive interface lines 201. The activity on interface lines 201 is illustrated on line 8 of FIG. 19A.

For the guidance of those skilled in the art with respect to the types of integrated circuits used in the above described optical link interface, please refer to the type numbers printed in each functional block of the logic diagrams referred to herein. By placing a 74 in front of this type number, the catalog number of the particular member of the TTL family that this functional block belongs to can be obtained. A complete disclosure of the electrical characteristics and pin assignments of each functional block can then be obtained by referring to any data book describing the TTL family such as the second edition of the Texas Instruments TTL Data Book for Design Engineers the pertinent data of which is incorporated herein by reference. The suggested type numbers for the functional blocks comprising the logic diagrams referred to herein are suggested only for purposes of description of the invention, and are not to be construed as the only integrated circuit types which could be utilized. Although the invention has been described in terms of the particular preferred embodiment illustrated herein, other embodiments employing the principles illustrated herein and which perform the same function in an equivalent manner by equivalent means are intended to be included.

What is claimed is:

1. A receiver apparatus for receiving optically transmitted binary data encoded in Manchester Code in serial format and preceded by a header signal and for decoding said data and converting it to parallel format digital data signals comprising:
    (a) a photodiode means for converting light signals carrying said binary data to electrical signals encoded in Manchester Code as the Received Manchester Data signal;
    (b) an amplifier means for amplifying said Received Manchester Data signal and for converting it to a digital Amplified Manchester Data signal;
    (c) a clock generator means for generating a Recovered Clock signal from said Amplified Manchester Data signal and for generating a Manchester Data Delayed signal and an SR Data signal comprising:
        (1) a first means for exclusive-ORing said Amplified Manchester Data signal with itself delayed a predetermined time such that a pulse is generated at the time of each transition in said Manchester encoded Amplified Manchester Data signal and having a duration equal to the delay imposed upon said Amplified Manchester Data signal and having a delayed output for outputting a delayed version of said Amplified Manchester Data signal;

(2) a second means having two stable binary states for receiving said pulses from said first means and having a Q output toggling from one said state to the other at each occurrence of said pulses and having an inverted output for generating a signal of the opposite binary state from that of the Q output, and having a reset input coupled through a first means for delay to said inverted output to reset said second means a predetermined time after said Q output assumes the logical one state;

(3) a second means for delay coupled to said delayed version of said Amplified Manchester Data signal for outputting a Manchester Data Delayed signal which is said delayed version of said Amplified Manchester Data signal delayed by a first predetermined delay, and for outputting an SR Data signal which is said Manchester Data Delayed signal delayed by a second predetermined delay;

(d) a header detector means for monitoring said Manchester Data Delayed signal to sense when a header signal appears therein signaling the commencement of data transmission, and for gating said Recovered Clock signal through said header detector means upon receipt of said header signal as a Data Clock output signal, and said header detector means for counting the number of Manchester encoded data bits received following said header signal and for generating a Data Latch signal when a predetermined number of said data bits has been received;

(e) a shift register means responsive to said SR Data and said Data Clock signals for receiving the Manchester encoded data bits in said SR Data signal serially at the rate of one data bit for every clock period of said Data Clock signal, and for gating said data in said shift register into a plurality of data latch storage buffers upon receipt of said Data Latch signal, said data latch storage buffers having parallel access output lines such that an external user device can read the data in said data latch storage buffers in parallel format.

2. An apparatus as defined in claim 1 wherein said header detector means comprises:

(a) a first means responsive to said Recovered Clock signal for counting the number of clock periods therein, said count corresponding to the number of data bits received, said first means also for generating said Data Latch signal when a predetermined count is reached, and having a clear input for receiving a signal to clear said first means back to a zero count;

(b) a second means responsive to said Manchester Data Delayed signal and coupled to said clear input of said first means for generating said signal to clear said first means when said header signal is received, said second means also for gating said Recovered clock signal through to said shift register means as said Data Clock signal upon receipt of said header signal.

* * * * *